United States Patent
Lin et al.

(10) Patent No.: US 9,027,916 B2
(45) Date of Patent: May 12, 2015

(54) MULTI-FUNCTIONAL VICE BASE

(71) Applicants: Chang Yi Lin, Taichung (TW);
Chang-Chih Lin, Taichung (TW)

(72) Inventors: Chang Yi Lin, Taichung (TW);
Chang-Chih Lin, Taichung (TW)

( * ) Notice: Subject to any disclaimer, the term of this patent is extended or adjusted under 35 U.S.C. 154(b) by 355 days.

(21) Appl. No.: 13/651,348

(22) Filed: Oct. 12, 2012

(65) Prior Publication Data

US 2014/0103593 A1  Apr. 17, 2014

(51) Int. Cl.

| | |
|---|---|
| *B23Q 3/06* | (2006.01) |
| *B25B 1/22* | (2006.01) |
| *B23K 37/04* | (2006.01) |
| *B25B 1/24* | (2006.01) |
| *B25B 1/06* | (2006.01) |
| *B25B 1/10* | (2006.01) |

(52) U.S. Cl.
CPC . *B23Q 3/061* (2013.01); *B25B 1/22* (2013.01); *B23K 37/0408* (2013.01); *B25B 1/2484* (2013.01); *B23Q 3/066* (2013.01); *B25B 1/06* (2013.01); *B25B 1/103* (2013.01)

(58) Field of Classification Search
USPC .......................................................... 269/95
See application file for complete search history.

(56) References Cited

U.S. PATENT DOCUMENTS

| | | | | |
|---|---|---|---|---|
| 2,676,413 | A * | 4/1954 | Wharton et al. | 33/573 |
| 4,557,371 | A * | 12/1985 | Yonezawa | 198/867.05 |
| 6,232,553 | B1 * | 5/2001 | Regen | 174/64 |
| 6,349,929 | B1 * | 2/2002 | Speltz et al. | 269/242 |
| 7,156,384 | B1 * | 1/2007 | Varnau | 269/25 |
| 7,865,981 | B2 * | 1/2011 | Harrow | 5/400 |
| 8,002,254 | B2 * | 8/2011 | Bayer et al. | 269/305 |
| 2014/0021671 | A1 * | 1/2014 | Lin et al. | 269/257 |
| 2014/0054835 | A1 * | 2/2014 | Schmidt | 269/95 |

FOREIGN PATENT DOCUMENTS

DE       10330556 A1 *  2/2005  ............... B23Q 7/10

* cited by examiner

*Primary Examiner* — Lee D Wilson
*Assistant Examiner* — Alvin Grant

(57) ABSTRACT

A multi-functional vice base including a main body and a plate is provided. The main body includes a bottom surface, side surfaces and fixing portions. At least two side surfaces form a groove therebetween. Each fixing portion is disposed between the groove and the bottom surface. A first fixing member goes through a through hole of one of the fixing portions and is fixed on a working machine bench. The plate is detachably disposed at one of the side surfaces. Whereby the vice base can be mounted on various sized horizontal machining centers. Besides, plates with different size are allowed to be mounted on the main body for clamping work pieces whose sizes are different.

13 Claims, 10 Drawing Sheets

US 9,027,916 B2

MULTI-FUNCTIONAL VICE BASE

BACKGROUND OF THE INVENTION

1. Field of the Invention

The present invention relates to a vice base, more particularly, to a multi-functional vice base which is mounted to a working machine bench and adapted for securing vice thereon.

2. Description of the Prior Art

A conventional vice is used to clamp a work piece. The conventional vice includes a base, a movable jaw and a fixed jaw are disposed on the base, and a vice base is mounted on the bottom of the base. The vice base is secured to a working machine bench of a horizontal machining center. Various sized vices can be used to effectively clamp various sized work pieces, respectively. Various sized vices each has a vice base whose size corresponds to the size of the corresponding vice. The bottom of the main body of the vice base is mounted with a fixation base which is larger than the main body in size. That is, various sized vice vices respectively have fixation bases with different sizes, and the fixation bases with different sizes should be mounted to working machine benches of horizontal machining centers with respective sizes corresponding thereto.

However, for precision machining industry, it must spend a lot of money to purchase plural vice bases with different sizes, and vice bases occupy much space.

The present invention is, therefore, arisen to obviate or at least mitigate the above mentioned disadvantages.

SUMMARY OF THE INVENTION

An object of the present invention is to provide a multi-functional vice base which can be adapted to be mounted to a working machine bench of any sized horizontal machining center and for securing any sized vice, so as to lower the cost of purchasing vice bases and decrease the occupied space by the vice bases.

To achieve the above and other objects, a multi-functional vice base adapted to be mounted to a working machine bench is provided, wherein the working machine bench is provided with a plurality of through holes. The multi-functional vice base includes a main body. The main body includes a bottom surface, a plurality of side surfaces and at least one fixing portion. At least two side surfaces form a groove therebetween, and the fixing portion is disposed between the groove and the bottom surface. The fixing portion is formed with at least one penetrating hole, and the penetrating hole is communicated with and between the groove and the bottom surface. A first fixing member is disposed through the penetrating hole and fixed in one of the through holes.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
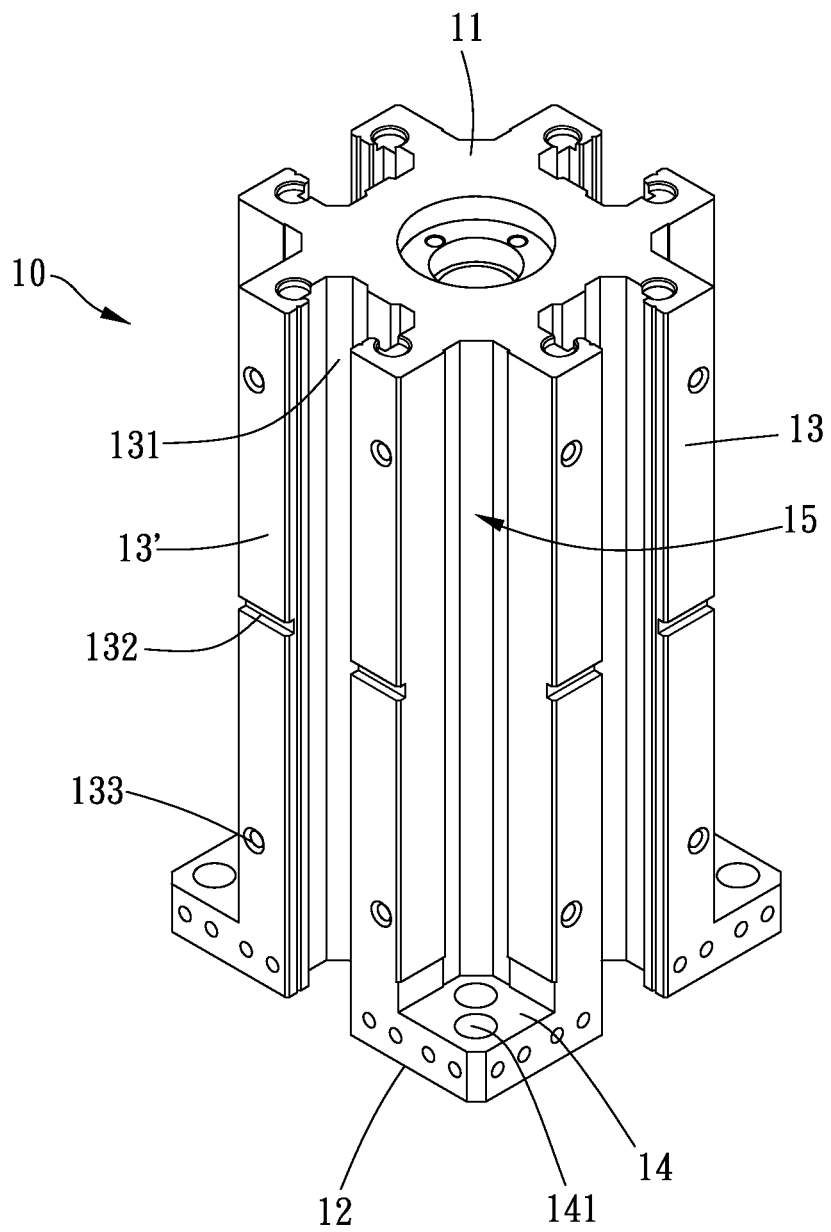
FIG. 1 is a perspective view of a preferred embodiment of the present invention.

As shown in FIG. 1, a multi-functional vice base according to a preferred embodiment of the present invention includes a main body 10. The main body 10 includes a top surface 11, a bottom surface 12, a plurality of side surfaces 13, 13' and a plurality of fixing portions 14. Every two adjacent side surfaces 13, 13' form a groove 15 therebetween. The fixing portions 14 are disposed between the respective grooves 15 and the bottom surface 12. More specifically, one end of each groove 15 goes through the top surface 11 and axially extends to one of the fixing portions 14, that is, each fixing portion 14 substantially severs as the bottom of each groove 15. In this embodiment, each groove 15 has a contours tapered and angled inwardly, and a part of the contours of each fixing portion 14 corresponds to the contours of each groove 15 and another part of the contours of each fixing portion 14 corresponds to the two side surfaces 13, 13', so that each fixing portion 14 is generally a polygonal bulk and each fixing portion 14 has a cross-sectional area greater than that of each groove 15 in a longitudinal direction of the main body 10. In an alternative preferred embodiment, one of edges of each fixing portion 14 is connected to and between the two side surfaces 13, 13', so that each fixing portion 14 is generally quadrilateral or triangular and has a relatively small volume and each fixing portion 14 has a cross-sectional area substantially equal to that of each groove 15. Each fixing portion 14 is formed with two penetrating holes 141, and each penetrating hole 141 is communicated with and between one of the grooves 15 and the bottom surface 12. Preferably, the two penetrating holes 141 are arranged in a direction which is tilted relative to the respective normal lines of the two side surfaces 13, 13' adjacent thereto. Preferably, the direction in which the two penetrating holes 141 are arranged and the normal lines of the two side surfaces 13, 13' form angles of about 45 degrees, respectively.

Figure 2:
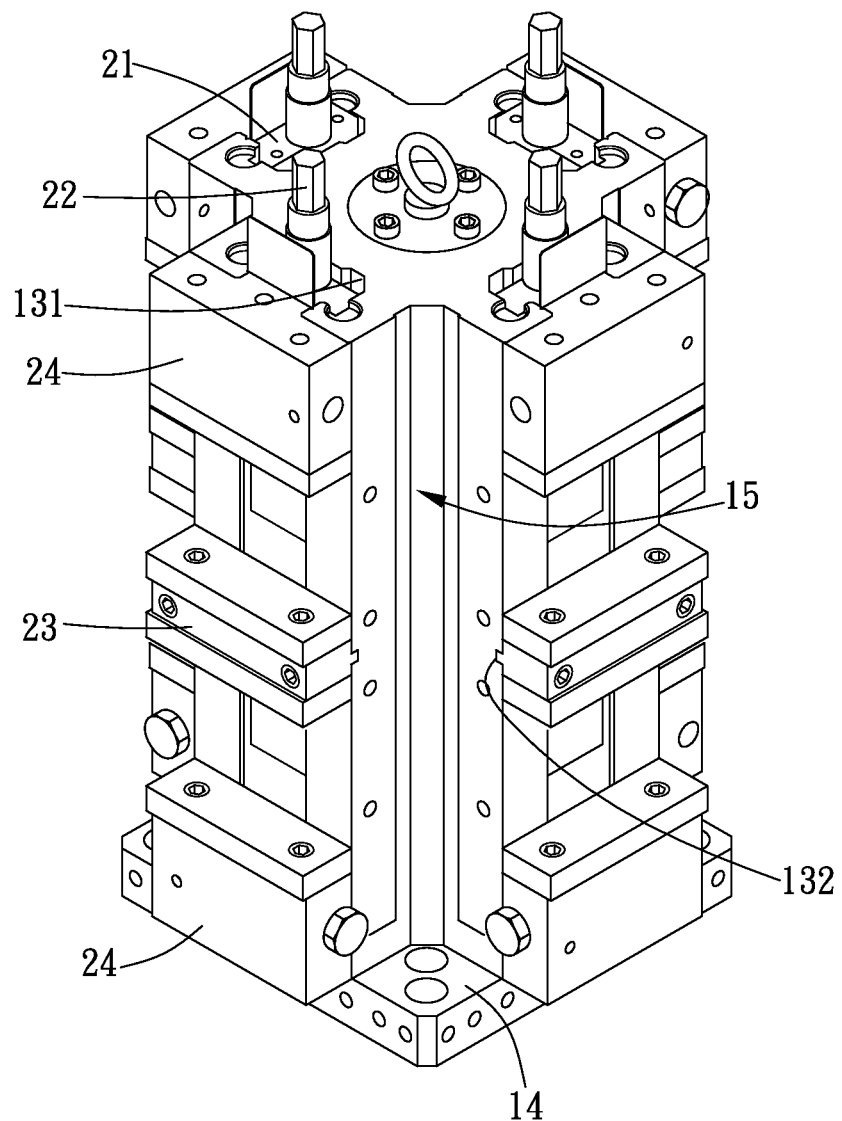
FIG. 2 is a perspective view showing each one side surface secured with a fixed jaw and two movable jaws according to a preferred embodiment of the present invention.
Figure 8:
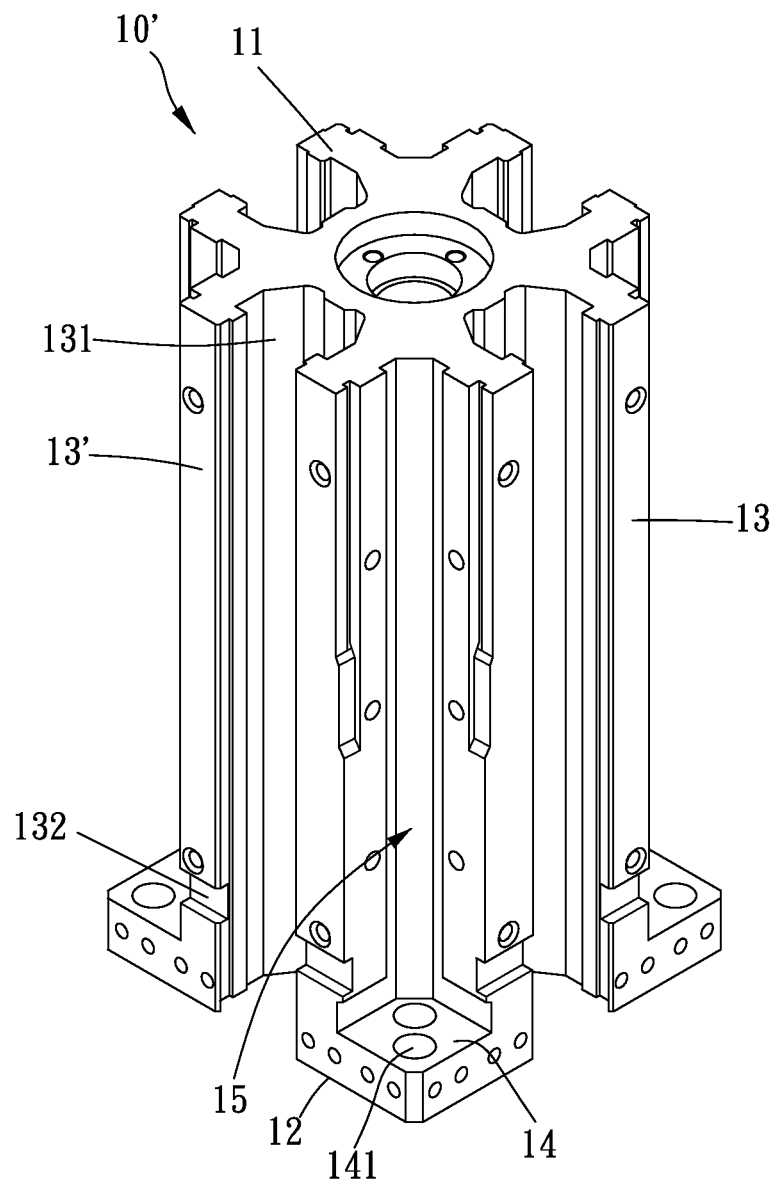
FIG. 8 is a perspective view of an alternative embodiment of the present invention.
Figure 9:
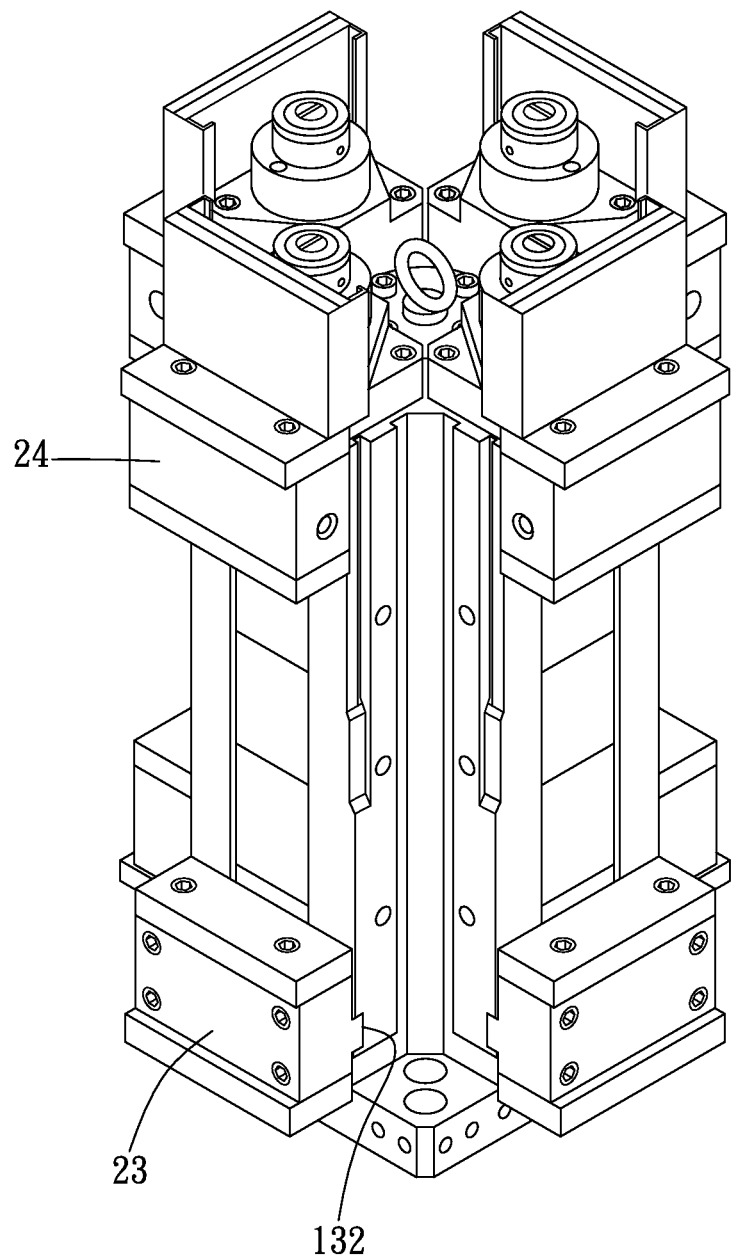
FIG. 9 is a perspective view showing each side surface secured with a fixed jaw and two movable jaws according to an alternative embodiment of the present invention.

The side surfaces 13, 13' are formed with a positioning slot 131, respectively. The positioning slot 131 is, in this embodiment, T-shaped. Each of the side surface 13, 13' is formed with two corresponding wedge slots 132, and the wedge slots 132 are located by two sides of each positioning slot 131 respectively and at the middle portion of the side surface. The positioning slot 131 is for securing a vice having two clamping bases thereto. More specifically, as shown in FIG. 2, the vice having two clamping bases includes two slidable bases 21, a threaded rod 22, a fixed jaw 23 and two movable jaws 24. The two slidable bases 21 are slidably disposed in the positioning slot 131. The threaded rod 22 is disposed in the positioning slot 131 and through the two slidable bases 21. The two movable jaws 24 are fixed to one of the slidable bases 21, and the fixed jaw 23 is secured in the wedge slots 132. The two slidable bases 21 are movable along the positioning slot 131 to drive the two movable jaws 24 to approach or be away from the fixed jaw 23. Each of the side surfaces 13, 13' of the main body serves as a base of the vice having two clamping bases. As shown in FIGS. 8 and 9, in an alternative preferred embodiment of the present invention, the wedge slots 132 are adjacent to the top surface 11 or the bottom surface 12 (in FIGS. 8 and 9, the two wedge slots 132 are adjacent to the bottom surface 12), so that the positioning slot 131 is for securing a vice having one single clamping base thereto. As shown in FIG. 9, the amount of clamping base and movable jaw are less than that of the vice having two clamping bases by one. In another embodiment of the present invention, each of the side surfaces 13, 13' of the main body 10' of the vice serves as a single-clamping base. The main bodies 10, 10' may be made of cast iron or aluminum alloy. The main bodies 10, 10' are treated by heat treatment during its manufacturing process, such that each of the side surfaces 13, 13' of the main bodies 10, 10' has better surface structure strength which can compare with that of a vice base. The surfaces of the main bodies 10, 10' are further ground so that each of the side surfaces 13, 13' of the main bodies 10, 10' can serves as a vice base. Additionally, the bulk structure strength of the main bodies 10, 10' can be enhanced via heat treatment.

Figure 3:
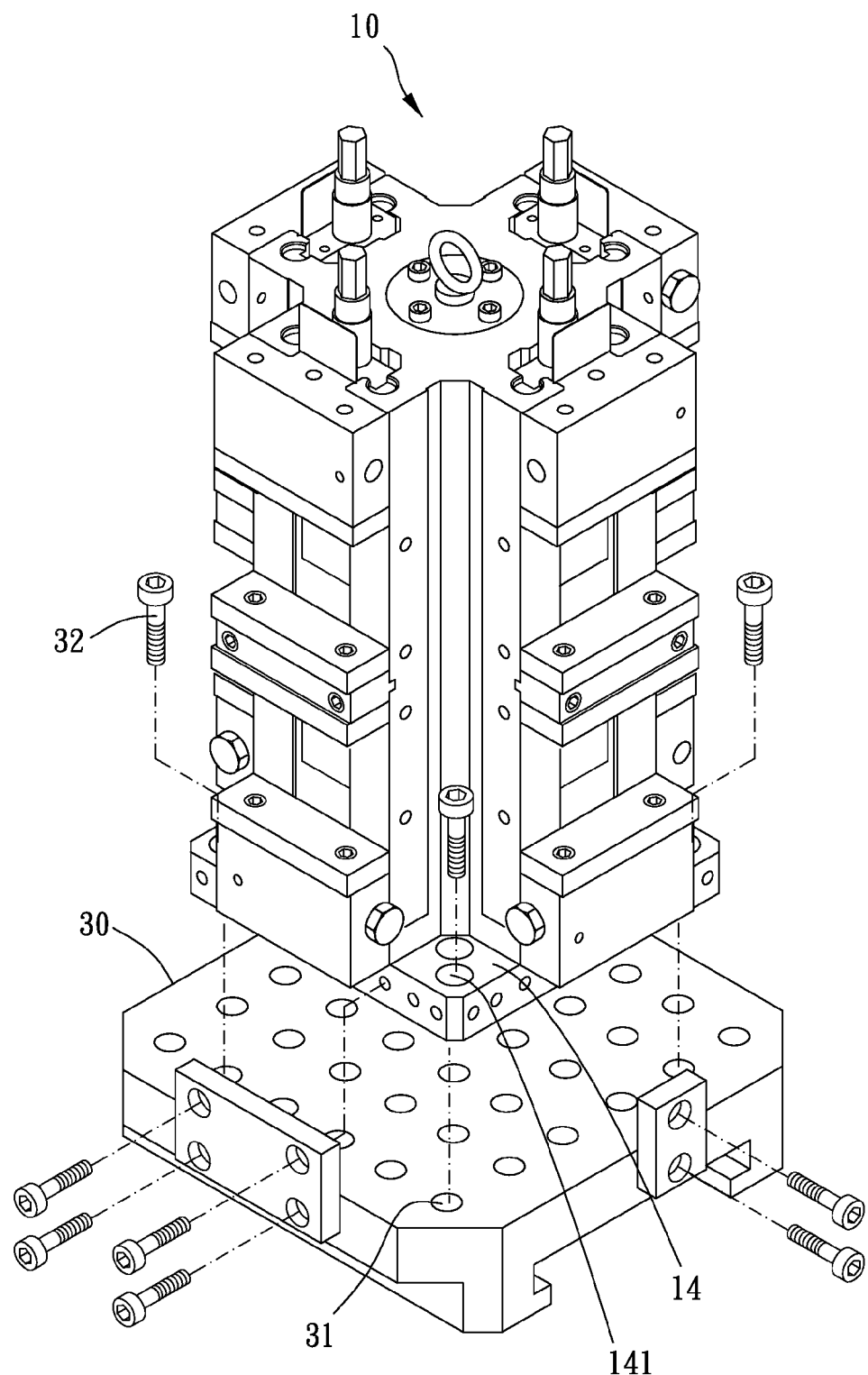
FIG. 3 is a view showing a multi-functional vice base secured to a working machine bench according to a preferred embodiment of the present invention.

As shown in FIG. 3, the main body 10 is mounted on a working machine bench 30 of a horizontal machining center, and the working machine bench 30 is formed with a plurality of through holes 31. A plurality of first fixing members 32 are disposed through the penetrating holes 141 of the fixing portions 14 and fixed in the through holes 31, respectively, such that the main body 10 is secured on the working machine bench 30. In this embodiment, the first fixing member 32 is a screw or a bolt.

Figure 4:
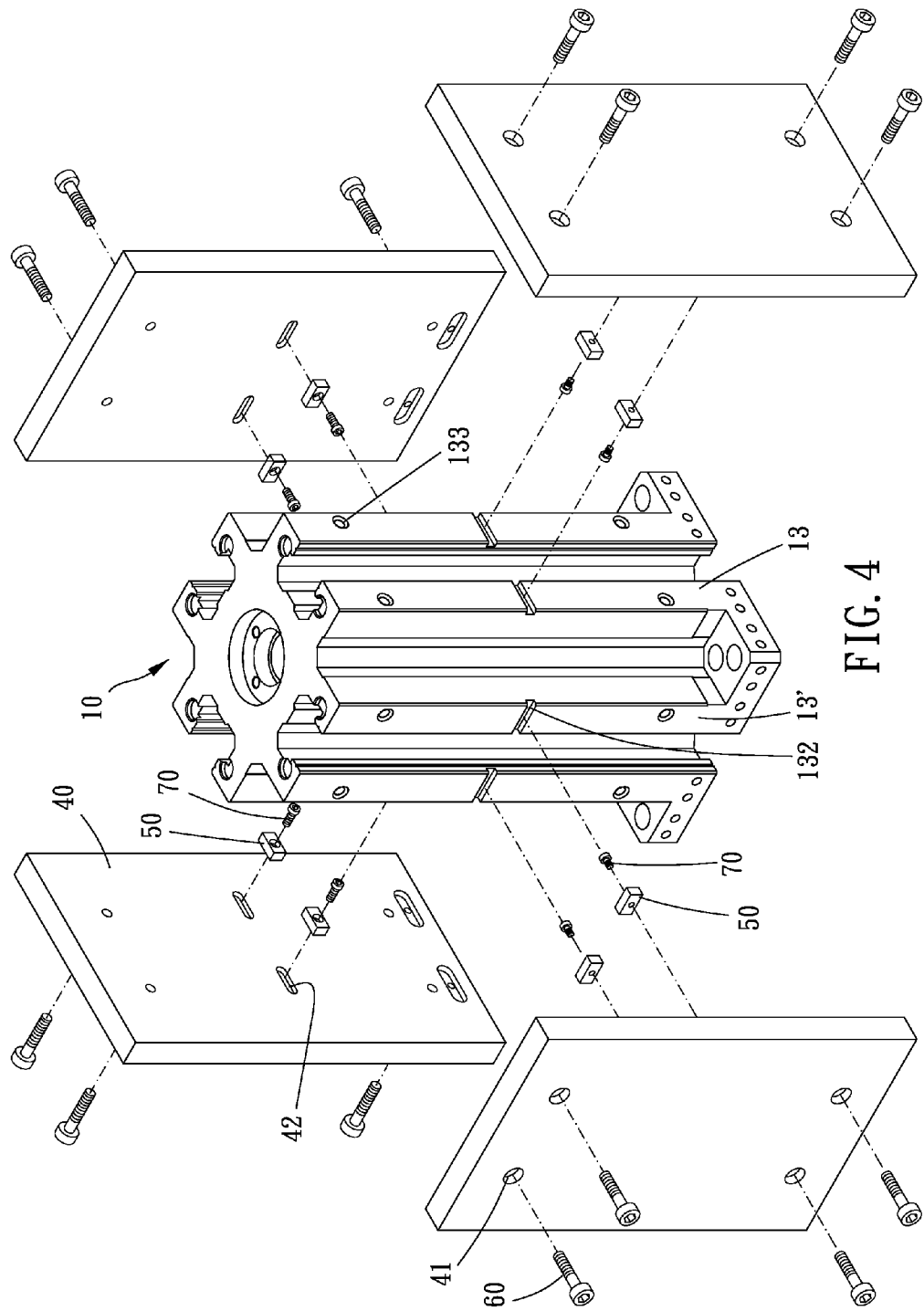
FIG. 4 is a breakdown view showing plates secured to respective side surfaces according to a preferred embodiment of the present invention.
Figure 10:
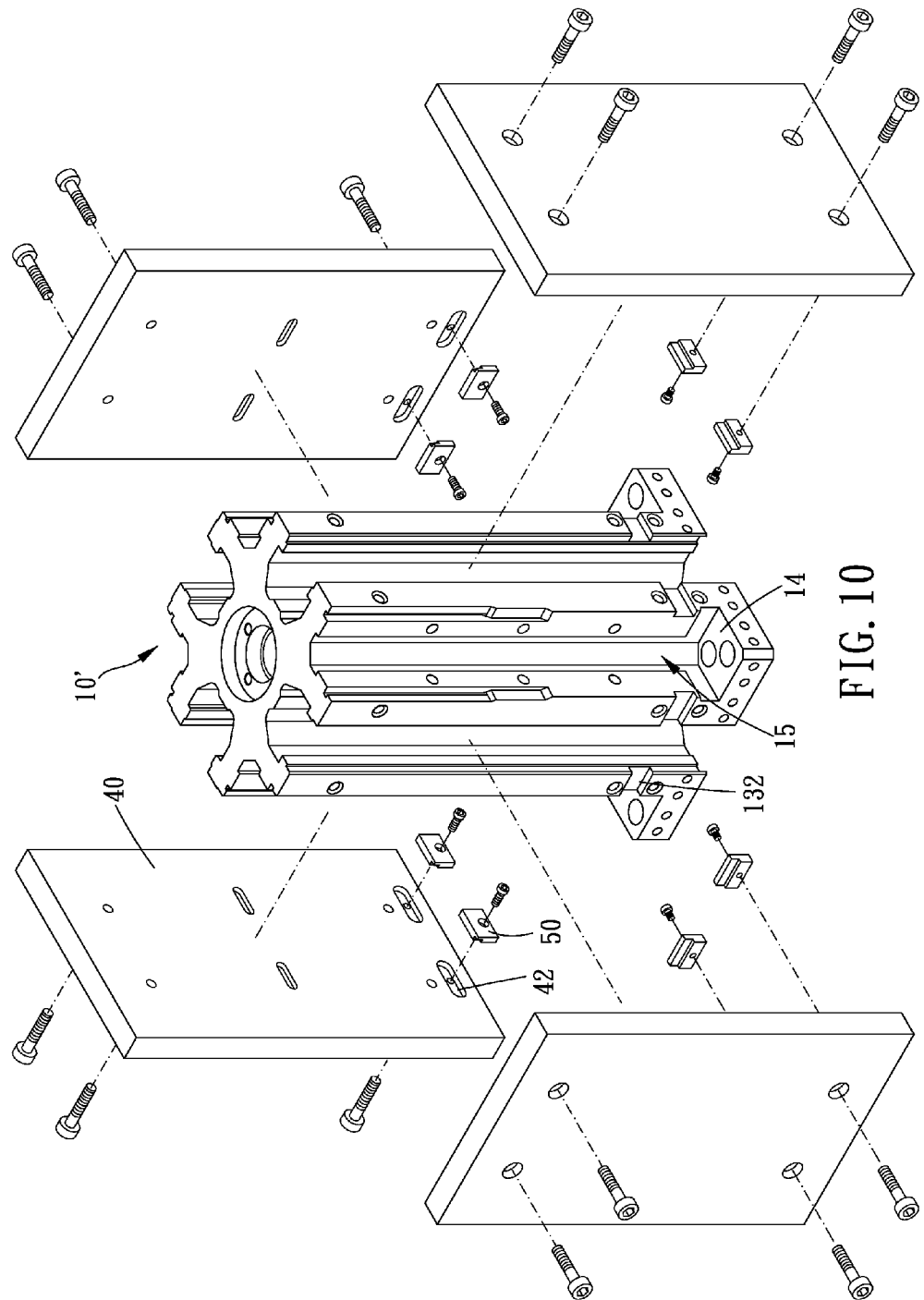
FIG. 10 is a breakdown view showing plates secured to respective side surfaces according to an alternative preferred embodiment of the present invention.

When each of the side surfaces 13, 13' of the main body 10 serves as a vice base, it can only suitable for the fixed jaw 23 and the movable jaw 24 with specific sizes to secure thereon. As shown in FIG. 4, the multi-functional vice base further includes a plate 40, two positioning bulks 50, a plurality of second fixing members 60 and a plurality of third fixing members 70. The plate 40 is formed with plurality of first fixing holes 41 and one side thereof is formed with two blocking slots 42. At least one of the side surfaces 13, 13' is formed with a plurality of second fixing holes 133. One side of each positioning bulk 50 is wedged in the one of the blocking slots 42 via the third fixing members, and the other side of each positioning bulk 50 is wedged in one of the wedge slots 132. The second fixing members 60 are disposed through the first fixing holes 41 and fixed in the second fixing holes 133, respectively, so that the plate 40 is detachably disposed on one of the side surfaces 13, 13' of the main body 10. The shape of each positioning bulk 50 is designed according to the shape of the blocking slot 42. As shown in FIG. 4, in a preferred embodiment, the two blocking slots 42 correspond to the two wedge slots 132 and are substantially located near the middle portion of the plate 40, and each positioning bulk 50 is substantially rectangular. The second, third fixing members 60, 70 are, in this embodiment, screws or bolts. As shown in FIG. 10, in an alternative embodiment, the two blocking slots 42 correspond to the two wedge slots 132 and are substantially located near the bottom of the plate 40, and each positioning bulk 50 is L-shaped. The plate 40 is for securing a vice base thereon (not shown). More specifically, the vice may be a vice base having a single clamping base or a vice base having two clamping bases. The vice includes not only the aforementioned threaded rod, fixed jaw, slidable base and movable jaw but also a base (not shown). The plate 40 is for securing the vice base thereon, while the other parts of the vice are disposed on the base. Whereby, an user can choose the size of the plate 40 according to the required vice size, such that the multi-functional vice base can be adapted for securing vices whose sizes are different thereon.

Figure 5:
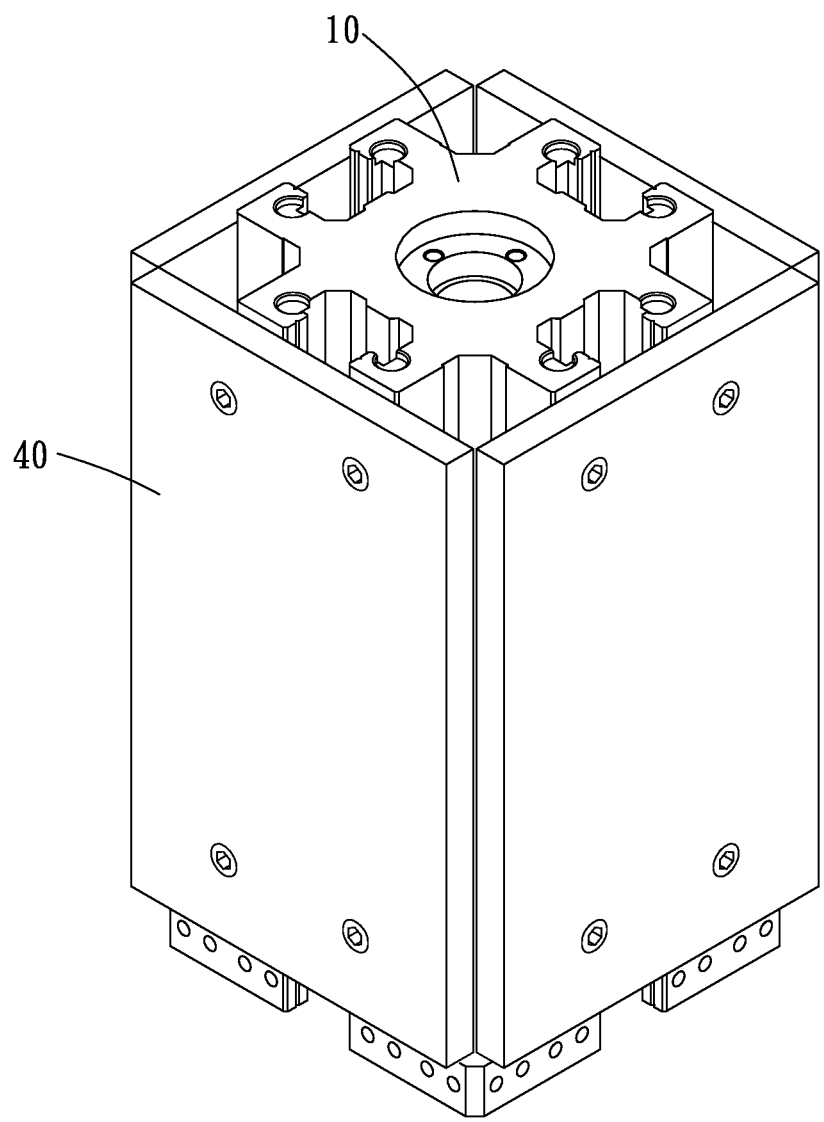
FIG. 5 is a perspective view showing flat plates secured to respective side surfaces according to a preferred embodiment of the present invention.
Figure 6:
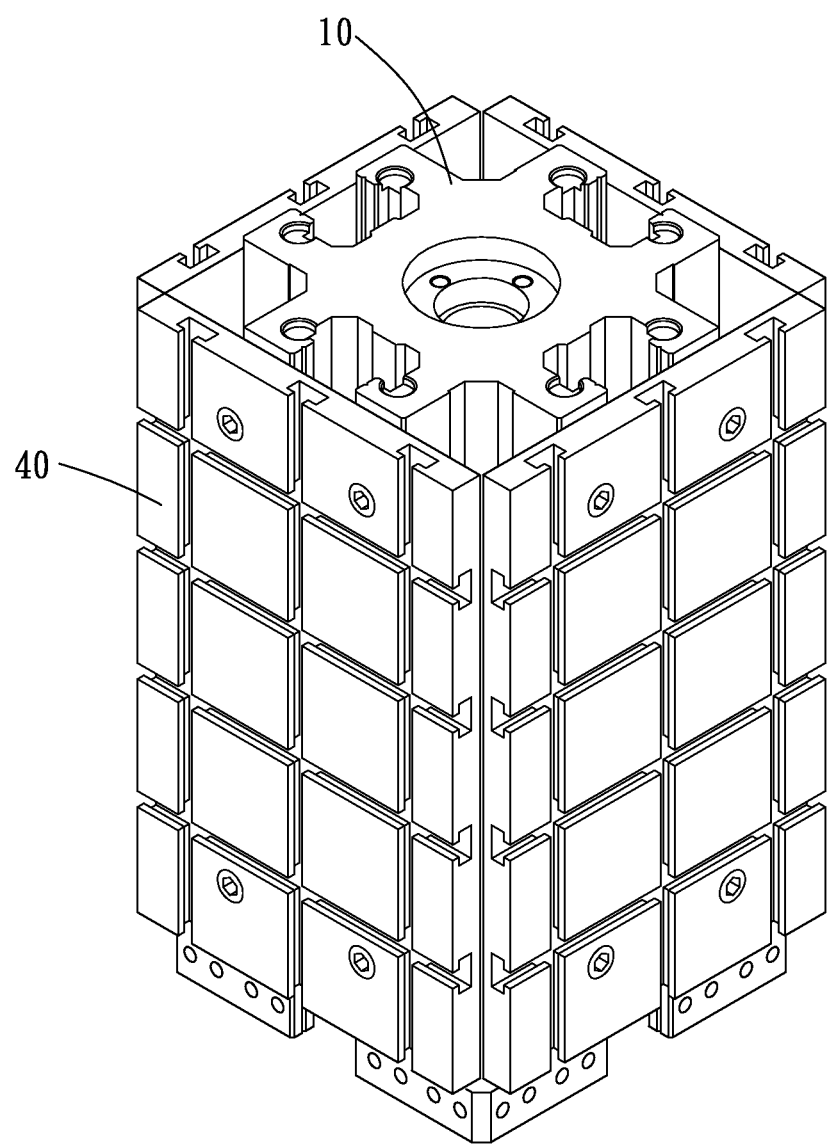
FIG. 6 is a perspective view showing plates which have T-shaped slots secured to respective side surfaces according to a preferred embodiment of the present invention.
Figure 7:
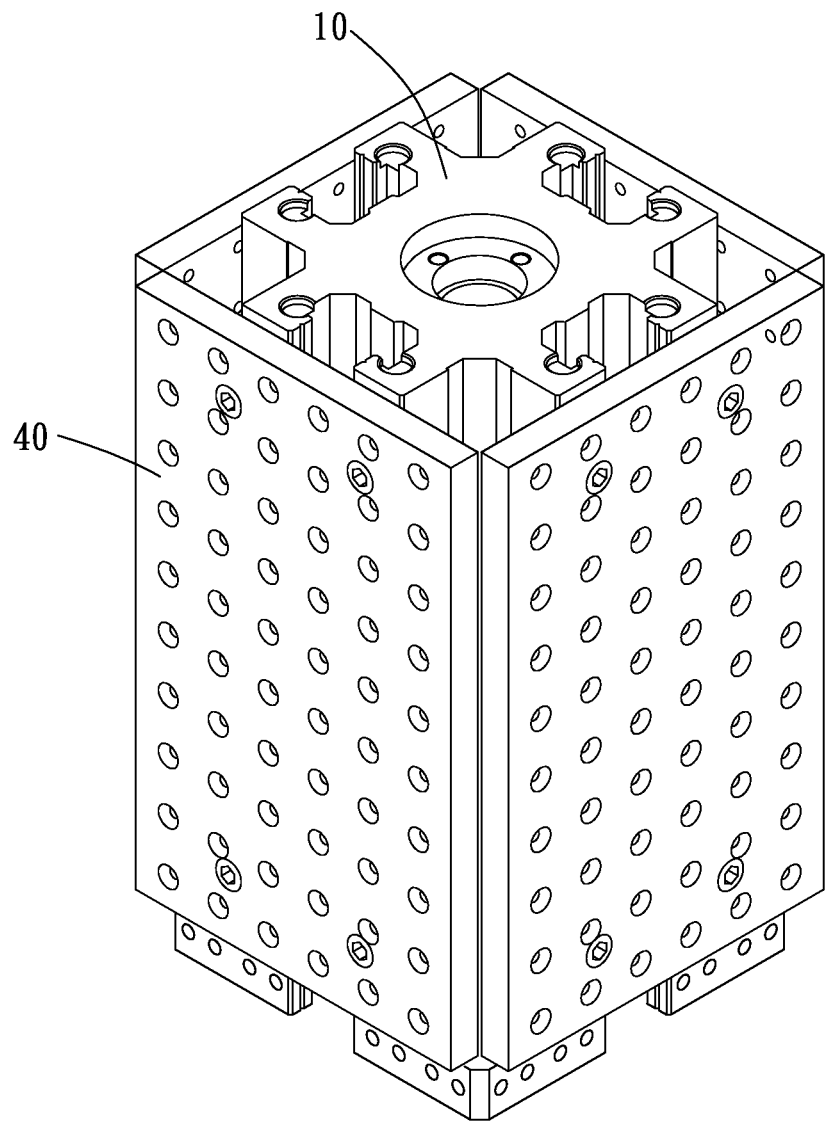
FIG. 7 is a perspective view showing plates which have holes secured to respective side surfaces according to a preferred embodiment of the present invention.

Additionally, the plate 40 may be a flat plate (as shown in FIG. 5), a plate having T-shaped slots (as shown in FIG. 6) or a plate having holes (as shown in FIG. 7). The flat plate can be drilled to form holes thereon according to the user's need; the plate having T-shaped slots and the plate having holes can provide selectively various kinds of fixation of a vice thereto.

In the invention, every two adjacent side surfaces 13, 13' of the main bodies 10, 10' form a groove 15 therebetween, the fixing portions 14 are disposed between the groove 15 and the bottom surface 12, and the plates 40 which are of different kinds or sizes can be detachably disposed on the side surfaces 13, 13' of the main bodies 10, 10'. As such, the multi-functional vice base can be mounted to working machine benches 30 of various sized horizontal machining centers, and vices with different sizes can be secured to the vice base via using the plates 40 having corresponding sizes, for clamping work pieces whose size are different, so as to lower the cost of purchasing vice bases and decrease the occupied space by the vice bases.

Furthermore, the side surfaces 13, 13' of main body is formed with the wedge slots 132 which can be adapted for the positioning bulk 50 that is wedged in the blocking slot 42 of the plate 40 to be wedged therein, so that the plate 40 can be precisely disposed in a predetermined position on the side surfaces 13, 13' of the main bodies 10, 10'. Besides, the side surfaces 13, 13' of the main bodies 10, 10' are formed further with the positioning slots 131 which cooperate with the corresponding wedge slots 132, so as to provide a vice base having a single size, and it is thus more utility.

It is noted that the main bodies 10, 10' of the multi-functional vice base is provided with the grooves 15 and the positioning slots 131, so that the main bodies 10, 10' is lighter than a conventional vice base in weight. Hence, the main bodies 10, 10' are preferably treated by heat treatment during its manufacturing process, so as to considerably upgrade the structural strength of the main bodies 10, 10', and the main bodies 10, 10' can be lighter and has great structural strength which can compare with that of a conventional vice base, so that the side surfaces 13, 13' of the main bodies 10, 10' can replace the vice base and be adapted for securing other parts of the vice to be mounted thereon.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A multi-functional vice base, adapted to be mounted to a working machine bench, the working machine bench provided with a plurality of through holes, the multi-functional vice base including a main body, the main body including a bottom surface, a plurality of side surfaces and at least one fixing portion, every two adjacent side surfaces of said plurality of surfaces form one groove therebetween, the fixing portion disposed between the groove and the bottom surface, the fixing portion formed with at least one penetrating hole, the penetrating hole communicated with and between the groove and the bottom surface, and a first fixing member being disposed through the penetrating hole and fixed in one of the through holes;
  wherein the main body includes a plurality of fixing portions, the fixing portions are disposed between the respective grooves and the bottom surface;
  wherein at least one of the side surfaces is formed with a positioning slot;
  wherein the side surface is formed with two corresponding wedge slots, the wedge slots are located by two sides of the positioning slot respectively, and the wedge slots are configured to secure a fixed jaw thereto.

2. The multi-functional vice base of claim 1, wherein the main body is treated by heat treatment during its manufacturing process.

3. The multi-functional vice base of claim 1, wherein the main body is treated by heat treatment during its manufacturing process.

4. The multi-functional vice base of claim 1, wherein the main body is treated by heat treatment during its manufacturing process.

5. The multi-functional vice base of claim 1, wherein the main body is treated by heat treatment during its manufacturing process.

6. A multi-functional vice base, adapted to be mounted to a working machine bench, the working machine bench provided with a plurality of through holes, the multi-functional vice base including a main body, the main body including a bottom surface, a plurality of side surfaces and at least one fixing portion, at least two side surfaces forming a groove therebetween, the fixing portion disposed between the groove and the bottom surface, the fixing portion formed with at least one penetrating hole, the penetrating hole communicates with and is situated between the groove and the bottom surface, and a first fixing member being disposed through the penetrating hole and fixed in one of the plurality of through holes, the multi-functional vice base further including a plate, wherein the plate is detachably disposed on one of the side surfaces of the main body, and the plate is configured to secure a vice base thereon.

7. The multi-functional vice base of claim 6, further including a plurality of second fixing members, the plate is formed with a plurality of first fixing holes, at least one of the side surfaces is formed with a plurality of second fixing holes, the second fixing members are disposed through the first fixing holes and fixed in the second fixing holes, respectively.

8. The multi-functional vice base of claim 6, further including two positioning bulks, the plate is formed with two blocking slots, each of the side surfaces is formed with two corresponding wedge slots, and one side of each positioning bulk is wedged in one of the blocking slots and the other side thereof is wedged in one of the wedge slots.

9. The multi-functional vice base of claim 6, wherein the main body is treated by heat treatment during its manufacturing process.

10. A multi-functional vice base, adapted to be mounted to a working machine bench, the working machine bench provided with a plurality of through holes, the multi-functional vice base including a main body, the main body including a bottom surface, a plurality of side surfaces and at least one fixing portion, at least two side surfaces forming a groove therebetween, the fixing portion disposed between the groove and the bottom surface, the fixing portion formed with at least one penetrating hole, the penetrating 331 hole communicates with and is situated between the groove and the bottom surface, and a first fixing member being disposed through the penetrating hole and fixed in one of the plurality of through holes, the multi-functional vice base further including a plate, wherein the plate is detachably disposed on one of the side surfaces of the main body, and the plate is configured to secure a base of a vice thereon;
  wherein the main body includes a plurality of fixing portions, every two of the side surfaces form one the groove, the fixing portions are disposed between the respective grooves and the bottom surface.

11. The multi-functional vice base of claim 10, further including a plurality of second fixing members, the plate is formed with a plurality of first fixing holes, at least one of the side surfaces is formed with a plurality of second fixing holes, the second fixing members are disposed through the first fixing holes and fixed in the second fixing holes, respectively.

12. The multi-functional vice base of claim 10, further including two positioning bulks, the plate is formed with two blocking slots, each of the side surfaces is formed with two corresponding wedge slots, and one side of each positioning bulk is wedged in one of the blocking slots and the other side thereof is wedged in one of the wedge slots.

13. The multi-functional vice base of claim 10, wherein the main body is treated by heat treatment during its manufacturing process.

* * * * *